3,117,021
COATING PROCESS
Eugene D. Klug, Wilmington, Del., assignor to Hercules Powder Company, Wilmington, Del., a corporation of Delaware
No Drawing. Filed Apr. 13, 1960, Ser. No. 21,890
14 Claims. (Cl. 117—104)

The present invention relates to a process of coating various articles and more particularly to such a process wherein the coating composition used is applied by subjecting it to heat and pressure.

By amylaceous material as used herein is meant any of the forms of starch, e.g., wheat, corn, sorghum, potato, tapioca, waxy maize, or amylose or amylopectin alone or any combination of amylose and amylopectin.

In defining the compositions of this invention the amount of plasticizer is expressed herein as percent by weight of the derivative of the amylaceous material as the derivative is normally dried in preparation; such dried derivatives contain about 1%–5% water. The percent water is expressed herein as percent by weight of the derivative of the amylaceous material on a bone dry basis.

Compositions containing derivatives of amylaceous materials have been used heretofore in the coatings field; however, their use has been quite limited because of certain drawbacks. One very serious drawback is that such coatings have been applied from aqueous solutions thereof. Under the conditions of applying the coatings, solutions of said derivatives are very viscous, so that the maximum concentration of solution is very low and much water must be evaporated in applying the coatings, thus presenting a serious commercial disadvantage not only from the standpoint of cost of removing the tremendous amount of water but also from the standpoint of limiting the rate at which the coatings may be applied to an object. One contribution of merit which the art has made toward solving this problem, although it has by no means solved the problem, is to degrade the starch derivative by various means (e.g. acid hydrolysis, oxidation, heat, light, high energy radiation, and enzymes) so that the viscosity is reduced sufficiently to enable the preparation of aqueous solutions of higher solids concentrations, say 50%–60%. While this is a substantial improvement over using the lower concentration solutions, it still entails the very serious drawback of application of the coatings from an aqueous solution.

An object of the present invention is to provide a process of coating articles. A further object is such a process wherein the coating composition used is applied by subjecting it to heat and pressure. A still further object is such a process wherein the coating composition flows under heat and pressure and is water soluble. Another object is such a process wherein the coating composition is applied from a hot melt thereof. These and other objects will become apparent from the description of this invention given hereinafter.

The above and other objects are accomplished according to this invention by carrying out the process of coating articles which comprises subjecting a water-soluble coating composition to heat and pressure during application of the coating, thereby causing the composition to flow, and maintaining the water content of the coating composition during application, said coating composition comprising (1) a derivative of an amylaceous material, (2) a plasticizer for said derivative, and (3) water, the amount of water being 1%–20% by weight of said derivative on a bone dry basis.

Compositions applicable to the present invention are those disclosed in my copending application, entitled "Compositions for Shaped Articles and Process," Serial No. 21,884, filed on even date herewith. These compositions include, e.g., plasticizer and water in admixture with various derivatives of amylaceous materials. These derivatives include, for example, the following water-soluble derivatives of amylaceous materials.

I. Ethers:

(1) Saturated alkyl, including, e.g., methyl ethyl, propyl
(2) Unsaturated alkyl, e.g., vinyl, allyl
(3) Hydroxyalkyl, e.g., hydroxyethyl, hydroxypropyl
(4) Carboxyalkyl, e.g., carboxymethyl, carboxyethyl carboxypropyl
(5) Cyanoalkyl, e.g., cyanoethyl II. Esters:

(1) Saturated fatty acid, e.g., acetyl, propionyl
(2) Unsaturated fatty acid, e.g., acrylyl III. Mixed derivatives comprising two or more of the ethers and/or esters in I and II above. Typical mixed derivatives are the carboxymethyl hydroxypropyl, methyl hydroxypropyl, ethyl hydroxyethyl, acetyl hydroxypropyl derivatives.

The following examples illustrate various embodiments of the present invention, but they are not intended to restrict the invention beyond the scope of the claims of this application. Viscosity as disclosed in this application was measured at 5% solids concentration of the derivative in aqueous solution at 25° C. with a Brookfield viscometer.

While this invention is applicable to coating articles in general, it has been found to be especially applicable to coating such articles as paper, fabric, and plastic articles. The following examples illustrate these applications.

EXAMPLES 1–6 (TABLE 1) COATING PAPER

In these examples paper was coated with several derivatives of amylaceous materials under various conditions as to coating compositions and conditions of applying the coating. In each case a rewettable, heat-sealable, flexible, glossy, smooth and colorless coating was applied which adhered well to the paper. In each example the derivative and plasticizer were uniformly mixed. The mixture was conditioned at 50% relative humidity and 25° C. for 24 hours and used immediately for coating. Thus, the resulting compositions were extruded through a 0.01" x 2" die opening of a 1" U.S. Rubber Machine Company extruder. The extruder was operated at the temperatures shown in Table 1 below and at a screw speed of 56 r.p.m. A continuous length of paper was coated with the compositions being extruded in the form of a ribbon by allowing the ribbon to be extruded onto the paper as the paper was passed about $\frac{1}{32}$" below the die in the direction of the extrusion. By operating with the speed of the paper greater than that of the ribbon, the ribbon was stretched such that coatings only 2 mils thick and 2" wide were applied to the paper. The coated paper adhered well to various other objects when the coatings were moistened and placed in contact with such objects, thus showing its utility in commercial type gummed tapes. The coated paper also adhered well to itself and to another piece of paper when pressed in contact therewith and heated.

Further details are given in Table 1 which follows. In the following tables various abbreviations are used as a matter of convenience. HPS is hydroxypropyl starch; HPA is hydroxypropyl amylose; HEAP is hydroxyethyl amylopectin; AAP is acetyl amylopectin.

The amylopectin derivatives were prepared from a commercial grade of waxy maize starch. The amylose derivative was prepared from a commercial grade of amylose obtained by fractionation of potato starch. The hydroxypropyl derivatives of starch were prepared from a commercial grade of wheat starch containing about 25% amylose and 75% amylopectin.

The percentages of water given in Table 1 hereinafter were determined by a modification of the method described in Mitchell and Snell, Aquametry, pages 178–179 (1958), Interscience Publishers, New York City. Thus a 2.5 gram sample of the mixture of derivative and plasticizer after conditioning as defined in footnote 2 of Table 1 was mixed with enough methanol to fill a 100 ml. volumetric flask. This was allowed to stand at about 25° C. for 45 minutes. Then an aliquot was analyzed by the Johannson modification of the Karl Fischer method (see the above Mitchell and Snell reference).

Further details are given in Table 1 which follows.

compositions or articles being coated are adversely affected such as deforming the articles being coated or decomposing the articles being coated or the coating compositions.

As to the coating compositions, the same variables and limitations apply to this invention as apply to the invention in my copending application identified hereinbefore.

This invention is applicable to coating any article which is not harmed by the temperatures necessary for causing the coating compositions to flow.

As is well known, there are numerous uses for coated paper other than the gummed tape mentioned above, although the gummed tape use is very large. For instance, enamel floor coverings normally contain asphalt-impregnated paper (often referred to as a felt base) attached to the underside of the enamel covering. One

*Table 1 (Examples 1–6), Coating Paper*

| Ex. | Derivative | | | Plasticizer | | $H_2O$, percent | Extrusion | | Coating Thickness, Mils |
|---|---|---|---|---|---|---|---|---|---|
| | Type | MS | Viscosity, cps. | Type | Amt., percent | | Temp., °F. | Screw Speed, r.p.m. | |
| 1 | HPS (¹) | 0.13 | 830 | Propylene Glycol | 60 | 11.7 | 250–270 | 56 | 2 |
| 2 | HPS (¹) | 0.23 | 1,110 | ___do___ | 60 | 10.3 | 230–250 | 56 | 2 |
| 3 | HPS (¹) | 0.31 | 530 | ___do___ | 60 | 9.0 | 230–250 | 56 | 2 |
| 4 | HPA | 0.5 | 90 | ___do___ | 50 | (²) | 300 | 56 | 2 |
| 5 | HEAP | 0.4 | 5 | ___do___ | 50 | (²) | 250–280 | 56 | 2 |
| 6 | AAP | 0.8 | 10 | ___do___ | 50 | (²) | 260–280 | 56 | 2 |

(¹) Made from wheat starch of about 25% amylose and 75% amylopectin.
(²) Plasticized derivative conditioned at 50% R.H. and 25° C. for 24 hours and used immediately for coating.

EXAMPLES 7 AND 8 (TABLE 2), COATING FABRIC AND PLASTIC

In Example 7 an 80 x 80 cotton print cloth was coated with acetylated starch. In Example 8 a film of linear poly(propylene) was coated with hydroxyethyl starch. These coatings were applied under substantially the same conditions and substantially the same results were obtained as in Examples 1–6 above, except as otherwise indicated. The coating reduced the oxygen and hydrocarbon permeability of the polypropylene film. If desired, in order to increase the penetration of the coating into the cloth the coated cloth may be passed between heated rolls.

Further details are given in Table 2 which follows.

serious difficulty which the art has experienced with such floor coverings is the migration of the asphalt through the enamel covering. A thin film of the composition of this invention applied between the enamel covering and the felt base eliminates this migration. The compositions of this invention are useful in coating cloth for the purpose of making gummed cloth for use in the manufacture or repairing of books and the like, and for making prepasted cloth-based wallpaper (sometimes referred to as oilcloth). These compositions are also useful as cloth stiffening agents and as a backing for rugs. If desired, the compositions of this invention may be used to coat other plastic articles besides linear polypropylene,

*Table 2 (Examples 7–8), Coating Fabric and Plastic*

| Ex. | Derivative | | | Plasticizer | | $H_2O$, percent | Extrusion | | Coating Thickness, Mils |
|---|---|---|---|---|---|---|---|---|---|
| | Type | MS | Viscosity, cps. | Type | Amt., percent | | Temp., °F. | Screw Speed, r.p.m. | |
| 7 | AS (¹) | 0.9 | 10 | Glycerol Monoacetate | 25 | (²) | 280 | 56 | 1 |
| 8 | HES (¹) | 0.4 | 150 | Glycerol | 30 | (²) | 250 | 56 | 0.2 |

(¹) Made from wheat starch of about 25% amylose and 75% amylopectin.
(²) Plasticized derivative conditioned at 50% R.H. and 25° C. for 24 hours and used immediately for coating.

As those skilled in this art will appreciate, the specific conditions given hereinbefore may be varied considerably within the present invention as defined in the appended claims.

While it is necessary in coating articles according to this invention to subject the coating compositions to heat and pressure in order to cause the compositions to flow and thus take advantage of this very valuable property of the compositions, the temperature and pressure may vary appreciably. Temperature and pressure vary inversely, i.e. the higher the temperature the lower the pressure required, and conversely. Good results have been obtained within the range of 200° F.–350° F. and 50–10,000 p.s.i. For most applications, 230° F.–280° F. and 100–500 p.s.i. are preferred. Broadly, then, applicable temperatures and pressures may range from those at which the coating compositions being applied will flow to just short of the temperatures at which either the coating and I have found that they have good adhesion to plastic articles in general. For instance, I have also obtained excellent results in coating poly(ethylene glycol terephthalate) with said compositions. One very desirable property imparted to articles by coating them with the compositions of this invention is that of substantially reduced permeability to oxygen and hydrocarbons. This renders such coated articles much more suitable for wrapping objects containing these materials or making articles for packaging them.

This invention is applicable to coating articles with the compositions defined herein irrespective of the viscosity of the derivative employed in said compositions. Also, it is immaterial what means are employed to obtain the desired viscosity. That is, whether the viscosity of the derivative is low or high, I coat articles according to my invention using a hot melt of the composition instead of an aqueous solution thereof. In fact, coatings cannot be efficiently applied from aqueous solutions of these compositions. Large amounts of water would have to be evaporated when using aqueous solutions. This would be commercially unacceptable not only from the standpoint of cost of removing the tremendous amount of water but also from the standpoint of drastically limiting the rate a which the articles could be coated.

As those skilled in this art will appreciate, various additional materials may be used with the compositions of this invention. These additional materials include, e.g., clay, pigments, fillers in general, dyes.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. In the process of coating articles with derivatives of amylaceous materials, the improvement which comprises applying said derivatives from a composition containing 1% to 20% water and at least 3% plasticizer by flowing the composition under heat and pressure while maintaining said water content.

2. The process of claim 1 wherein the temperature of the composition employed during application of the coating is about 200° F.–350° F.

3. The process of claim 1 wherein the temperature of the composition employed during application of the coating is about 200° F.–350° F.

4. The process of claim 1 wherein the pressure is about 50–10,000 p.s.i.

5. The process of claim 1 wherein the pressure is about 100–500 p.s.i.

6. The process of claim 1 wherein the article being coated is paper.

7. The process of claim 1 wherein the article being coated is fabric.

8. The process of claim 1 wherein the article being coated is plastic.

9. The process of claim 1 wherein the article being coated is polypropylene film.

10. The process of claim 1 wherein the derivative is the hydroxyalkyl derivative of an amylaceous material.

11. The process of claim 1 wherein the derivative is hydroxypropyl starch.

12. The process of claim 1 wherein the derivative is hydroxypropyl amylose.

13. The proces of claim 1 wherein the derivative is hydroxyethyl amylopectin.

14. The process of claim 1 wherein the derivative is acetylated amylose.

References Cited in the file of this patent
UNITED STATES PATENTS

| | | |
|---|---|---|
| 2,070,600 | Jenett | Feb. 16, 1937 |
| 2,530,439 | Molteni | Nov. 21, 1950 |
| 2,693,042 | Jacobsen | Nov. 2, 1954 |
| 2,733,238 | Kerr et al. | Jan. 31, 1956 |
| 2,744,894 | Benedict et al. | May 8, 1956 |
| 2,798,990 | Davis | July 9, 1957 |
| 2,883,300 | Rickert | Apr. 21, 1959 |
| 2,955,958 | Brown | Oct. 11, 1960 |
| 2,965,518 | Meisel | Dec. 20, 1960 |
| 2,996,498 | Jarowenko | Aug. 15, 1961 |

OTHER REFERENCES

"Allyl Ether of Starch," Nichols et al., Industrial and Engineering Chemistry, vol. 37, February 1945, pp. 201–202.

"High-Amylose Cornstarch—Properties and Prospects," Senti et al., TAPPI, vol. 43, No. 4, April 1960.

Kerr: Chemistry & Industrial Starch, 2nd ed., Academic Press, Inc., N.Y., 1950, page 298.

UNITED STATES PATENT OFFICE
CERTIFICATE OF CORRECTION

Patent No. 3,117,021              January 7, 1964

Eugene D. Klug

It is hereby certified that error appears in the above numbered patent requiring correction and that the said Letters Patent should read as corrected below.

Column 5, line 7, for "a" read -- at --; line 29, for "200° F.-350° F." read -- 230° F.-280° F. --.

Signed and sealed this 2nd day of June 1964.

(SEAL)
Attest:

ERNEST W. SWIDER                          EDWARD J. BRENNER
Attesting Officer                            Commissioner of Patents